United States Patent
Washbourne

US005478385A

[11] Patent Number: 5,478,385
[45] Date of Patent: Dec. 26, 1995

[54] SEALING COMPOSITIONS

[75] Inventor: James Washbourne, Long Handborough, England

[73] Assignee: Oxford Brookes University, Oxford, England

[21] Appl. No.: 183,409

[22] Filed: Jan. 18, 1994

[30] Foreign Application Priority Data

Jan. 15, 1993 [GB] United Kingdom .................. 9300753

[51] Int. Cl.$^6$ .......................... C09K 3/10; C09D 191/06; C09D 191/08

[52] U.S. Cl. ........................ 106/33; 106/243; 106/266; 106/272

[58] Field of Search .............................. 106/33, 266, 243, 106/272

[56] References Cited

U.S. PATENT DOCUMENTS

| 4,524,159 | 6/1985 | Barber | 106/33 |
| 4,867,792 | 9/1989 | Ronlan | 106/33 |

FOREIGN PATENT DOCUMENTS

| 022212 | 1/1981 | European Pat. Off. . | |
| 093388 | 11/1983 | European Pat. Off. . | |
| 498627 | 8/1992 | European Pat. Off. . | |
| 0508719 | 10/1992 | European Pat. Off. | C09K 3/10 |
| 60-137984 | 7/1985 | Japan | 106/33 |
| 1228632 | 4/1971 | United Kingdom . | |
| 1274921 | 5/1972 | United Kingdom . | |
| 1366996 | 9/1974 | United Kingdom . | |
| 1500563 | 2/1978 | United Kingdom . | |
| 2043685 | 10/1980 | United Kingdom . | |
| 2128202 | 4/1984 | United Kingdom . | |

*Primary Examiner*—David Brunsman
*Attorney, Agent, or Firm*—Nixon & Vanderhye

[57] ABSTRACT

This invention relates to sealing compositions and, more particularly, sealing compositions for use in conjunction with tail seals of tunnelling machines. In particular a sealing composition according to the invention comprises, by mass, from 10 to 55% of a petroleum-derived wax, or wax-consistency hydrogenated vegetable oil or fat, or a polyisoobutane of oil, grease or wax consistency, or any combination of the above, from 0.5 to 15% of a lipophilic emulsifier, and water in sufficient concentration (at least 20% preferably 20–75%) to inhibit combustion of the composition.

19 Claims, No Drawings

SEALING COMPOSITIONS

This invention relates to sealing compositions and, more particularly, sealing compositions for use in conjunction with tail seals of tunnelling machines such as that described and claimed in Co-pending UK Patent Application No. 91.02357.2 published as European Patent Application No. 0498627 which is incorporated herein by reference.

An effective tail seal for use with tunnelling machines is necessary in order to prevent leakage of water, soil particles, slurry or water-based grout from around the machine and that part of a tunnel already formed by the machine. The joint between the machine and the lining is a telescopic one formed by the tunnelling machine plating (on the outside) and the segmental lining (on the inside). The lining is assembled inside the tail plating of the tunnelling machine. Rings of so called wire brush and spring steel plate seals are used to achieve a seal in the telescopic joint. The seal units are attached to the inside of the tunnelling machine tail plating and slide over the outside of the tunnel segmental lining. Thixotropic sealing compounds containing void blocking additives are used in conjunction with these seals.

Atmospheric conditions within a tunnel and, especially those in which compressed air is fed, present a potentially serious fire hazard when flammable hydrocarbon based sealing compositions are used without sufficient water mixed into them to inhibit flammability. It is an object of the present invention to provide sealing compounds which are suitable for use in such conditions without involving a fire risk.

According to the present invention a sealing composition comprises, 10–55% by weight of a petroleum-derived wax, or wax-consistency hydrogenated vegetable oil, or wax-consistency hydrogenated animal or fish oil or fat, or oil, grease, or wax-consistency polyisobutane, or combinations thereof;

0–5–15% by weight of a lipophilic emulsifier; and at least 20% by weight water, in an amount sufficient to inhibit combustion of the sealing composition.

The sealing composition may also include an emulsion stabiliser or thickener. The emulsion stabilizer or thickener preferably comprises up to 5% by weight pentaerythritol ester of lanolin fatty acid, or lanolin.

A water gellant/viscosifier, and a void-blocking additive may also be present in the sealing composition. Preferably the water gellant/viscosifier is present in an amount up to 10 by weight, and the void-blocking additive when present is present in an amount up to 15% by weight, and is in flake, fibre, chip or granulated form.

According to one particular sealing composition the void blocking additive comprises: mica flakes having a maximum dimension of between 0.5–5 mm; or cellophane flakes having a maximum dimension of 1.5–20 mm; or cotton fibre having a maximum dimension of 0.5–50 mm; or granulated wood chips, walnut shells, or cork having a maximum dimension of 0.5–5 mm.

The sealing composition may further include a preservative in an amount sufficient to minimize the possibility of fungal or bacteriological decomposition; or a corrosion inhibitor in an amount sufficient to minimize the possibility of corrosion of ferrous metallic compounds with which the sealing composition makes contact; or both a preservative and a corrosion inhibitor.

The invention also includes a method of preparing a sealing composition comprising the steps of:

(a) mixing together: 10.55% by weight of a petroleum-derived wax, or wax-consistency hydrogenated vegetable oil, or wax-consistency hydrogenated animal or fish oil or fat, or oil, grease, or wax-consistency polyisobutane, or combinations thereof; and 0.5–15% by weight of a lipophilic emulsifier, to produce a mixture;

(b) heating the mixture from step (a) to a temperature high enough to cause melting of the 10–55% by weight of a petroleum-derived wax, or wax-consistency hydrogenated vegetable oil, or wax-consistency hydrogenated animal or fish oil or fat, or oil, grease or wax consistency polyisobutane, or combinations thereof, to produce a melt;

(c) cooling the melt from step (b) to a temperature at or near the congealing temperature of components of the melt;

(d) heating at least 20% by weight water, in an amount sufficient to inhibit combustion of the sealing composition, to a temperature at or near the congealing temperature of step (c); and then (e) adding the water to the melt from step (c) to form a sealing composition emulsion.

Preferably steps (c) and (d) are each practised to a temperature of about 50–70 degrees C.

In a modification of the above method, step (a) is practised by adding up to 10% by weight of a water gellant/viscosifier, up to 15% b weight of a void-blocking additive, and up to 5% by weight of an emulsion stabilizer or thickener.

In a further modification step (a) is practised by adding an effective amount of corrosion inhibitor for minimising the possibility of corrosion of ferrous metallic compounds of equipment which the sealing composition may come into contact, and to add an effective amount of a preservative to minimize the possibility of fungal or bacteriological decomposition of the sealing composition.

The invention is also directed to a method of sealing a tunnel produced by a tunnelling machine having rows of seals, comprising the steps of:

(i) forming a sealing composition emulsion comprising: 10–55% by weight of a petroleum-derived wax, or wax-consistency hydrogenated vegetable oil, or wax-consistency hydrogenated animal or fish oil or fat, or oil, grease, or wax-consistency polyisobutane, or combinations thereof; 0.5–15% by weight of a lipophilic emulsifier: and at least 20% by weight water, in an amount sufficient to inhibit combustion of the sealing composition; and (ii) placing the sealing composition into and onto seals and between rows of seals of the tunnelling machine prior to tunnelling, or pumping the sealing composition into the seals of the tunnelling machine during tunnelling, Preferably step (i) is practised by the substeps of: (a) mixing together: 10–55% by weight of a petroleum-derived wax, or wax-consistency hydrogenated vegetable oil, or wax-consistency hydrogenated animal or fish oil or fat, or oil, grease, or wax-consistency polyisobutane, or combinations thereof; and 0.5–15% by weight of a lipophilic emulsifier, to produce a mixture; (b) heating the mixture from step (a) to a temperature high enough to cause melting of the 10–55% by weight of a petroleum-derived wax, or wax-consistency hydrogenated vegetable oil, or wax-consistency hydrogenated animal or fish oil or fat, or oil, grease, or wax-consistency polyisobutane, or combinations thereof, to produce a melt; (c) cooling the melt to melt from step (b) to a temperature at or near the congealing temperature of components of the melt; (d) heating at least 20% by weight water, in an amount sufficient to inhibit combustion of the sealing composition, to a temperature at or near the congealing temperature of step (c); and then (e) adding the water to the melt from step (c) to form a sealing composition emulsion. In one particular method, the substep (a) is practised by adding up to 10% by weight of a water gellant/viscosifier, up to 15% by weight of a void-blocking additive, and up to 5% by weight of an emulsion stabilizer or thickener.

If desired step (i) is practised to produce two forms of sealing composition emulsion, a trowelling grade form having large sized and high concentration void-blocking additives, and a pumping grade form having smaller sized and lower concentration void-blocking additives than the trowelling grade; and step (ii) is practised by placing the trowelling grade form sealing composition into and onto seals and between rows of seals of the tunnelling machine prior to tunnelling and by pumping the pumping grade form sealing composition int the seals of the tunnelling machine during tunnelling.

Specific examples of the components of the sealing composition and other additives which may be present in the sealing composition are indicated below.

Sealing Compound Base (20–75)% water in sufficient concentration to inhibit combustion of the final compound.

(10–55)% petroleum derived wax (eg paraffin wax, microcrystalline wax or slack wax), or wax consistency hydrogenated vegetable oil (eg rape seed oil or peanut oil) or wax consistency hydrogenated animal or fish oil or fat, or polyisobutane of oil, grease or wax consistency or any combination of the above in the proportion (10–55)% of the total mix.

(0.5–15)% lipophilic emulsifier (eg sorbitan mono oleate or sorbitan mono isostearate).

(0–5)% pentaerythritol ester of lanolin fatty acid or lanolin to improve emulsion stability and act as a thickening additive.

Hydrophilic Water Gellants/Viscosifiers (0–10)% water gellant/viscosifier including Laponite artificial clay and/or natural clay and/or cellulose polymer and or other similar polymer.

Void Blocking Additives (0–15)% flake void blocking additive in the form of mica and/or cellophane flake. Conveniently the flakes of mica will have a maximum dimension (0.5–5) mm and in the case of cellophane flakes (1.5–20) mm. and/or (0–10)% fibre void blocking additive in the form of cotton or similar natural or artificial fibre. Conveniently the fibres will have a maximum dimension (0.5–50) mm. and/or (0–15)% granulated void blocking additive in the form of wood chips, granulated walnut shells, cork granules or similar natural or artificial void blocking granules. Conveniently the granules will have a maximum dimension (0.5–5) mm.

Such sealing compounds possess a shear strength of 100–5000 Pascals at ambient temperatures (5°–25° C.) depending upon composition.

The sealing compositions may be produced in two forms— a "trowelling grade" for hand placing into and onto the seals and between rows of seals before the tunnelling machine is launched into the ground, and a "pumping grade" sealing compound for pumping into the seals to make up sealing compound losses onto the outside of the tunnel lining as the tunnelling machine moves forward relative to it.

When "trowelling grade" sealing compound is required, the composition may contain longer fibrous void blocking additive and/or larger flake or granulated void blocking additives than the pumping grade, and in a higher concentration. It is believed that the mica and cellophane flake additive and/or the granules together with the fibre additive fulfil the function of void blocking additives when present in the sealing composition as a dispersion. It is also believed that the fibres serve to retain the mica flake and cellophane flake and/or granules in the sealing compound.

Sealing compositions in accordance with the present invention may also include a corrosion inhibitor in order to reduce the possibility of corrosion of ferrous metallic compounds of the tail seals or other equipment with which the sealing composition makes contact.

Sealing compositions in accordance with the present invention may also include a preservative in order to reduce the possibility of fungal or bacteriological decomposition of the components incorporated into the sealing compounds.

In preparing the sealing composition the emulsification is preferably carried out by the following procedure. The wax or wax-consistency material is heated to melting and the other ingredients are added to it except for the water. It is important to cool the resulting melt to a temperature at which good emulsification can be achieved, preferably at or close to the congealing temperature. Depending on the wax used this might be a temperature of 50°–70° C. eg 60° C. The water, preheated to approximately the same temperature, is then added and the emulsion formed by any suitable mechanical method.

One form of composition in accordance with this invention is exemplified below:

EXAMPLE

A pumping grade composition is prepared having the following percentage composition by mass:

| | |
|---|---|
| Water | 45 |
| Slackwax | 32 |
| Sorbitan mono-oleate | 10 |
| Water Gellant and viscosifier (Drispac cellulose polymer) | 0.5 |
| Fine mica | 2.5 |
| Cohesion inducer (HIVIS 30, B.P. Ltd) | 10 |

The emulsion is formed by mixing the components as described hereinabove.

I claim:

1. A sealing composition, comprising:
   10–55% by weight of: a petroleum based wax; or hydrogenated vegetable oil; hydrogenated animal or fish oil, fat, or grease; or polyisobutane; or combinations thereof;

0.5–15% by weight of a lipophilic emulsifier;

an emulsion stabilizer or thickener;

a water gellant/viscosifier;

a void-blocking additive;

a corrosion inhibitor in an amount sufficient to minimize the possibility of corrosion of ferrous metallic compounds with which the sealing composition makes contact; and at least 20% by weight water, in an amount sufficient to inhibit combustion of the sealing composition.

2. A sealing composition as recited in claim 1 wherein the emulsion stabilizer or thickener comprises 0.5 to 5% by weight pentaerythritol ester of lanolin fatty acid, or lanolin.

3. A sealing composition as recited in claim 1 wherein the water gellant/viscosifier is present in an amount of about 10% by weight.

4. A sealing composition as recited in claim 1 wherein the void-blocking additive is in flake, fiber, chip, or granulated form.

5. A sealing composition as recited in claim 4 wherein the void-blocking additive comprises: mica flakes having a maximum dimension of between 0.5–5 mm; or cellophane flakes having a maximum dimension of 1.5–20 mm; or cotton fibre having a maximum dimension of 0.5–50 mm; or granulated wood chips, walnut shells, or cork having a maximum dimension of 0.5–5 mm.

6. A sealing composition as recited in claim 1 wherein the void-blocking additive is present in an amount of about 15% by weight, and is in flake, fiber, chip, or granulated form.

7. A sealing composition as recited in claim 1 further comprising a preservative in an amount sufficient to minimize the possibility of fungal or bacteriological decomposition.

8. A method of preparing a sealing composition comprising the steps of:

(a) mixing together: 10–55% by weight of a component comprising: a petroleum based wax; hydrogenated vegetable oil; hydrogenated animal or fish oil, fat, or grease; polyisobutane; or combinations thereof; and 0.5–15% by weight of a lipophilic emulsifier, to produce a sealing composition mixture;

(b) heating the mixture from step (a) to a temperature high enough to cause melting of the 10–55% by weight component to produce a sealing composition melt;

(c) cooling the melt from step (b) to a temperature at or near the congealing temperature of components of the melt;

(d) heating at least 20% by weight water, in an amount sufficient to inhibit combustion of the sealing composition, to a temperature at or near the congealing temperature of step (c); and then (e) adding the water from step (d) to the melt from step (c) to form a sealing composition emulsion.

9. A method as recited in claim 8 wherein steps (c) and (d) are each practiced at to a temperature of between about 50–70 degrees C.

10. A method as recited in claim 8 wherein step (a) is further practiced to add a water gellant/viscosifier, a void-blocking additive, and an emulsion stabilizer or thickener.

11. A method as recited in claim 8 wherein step (a) is further practised to add an effective amount of corrosion inhibitor for minimising the possibility of corrosion of ferrous metallic compounds of equipment which the sealing composition may come into contact.

12. A method as recited in claim 11 wherein step (a) is further practiced to add an effective amount of a preservative to minimize the possibility of fungal or bacteriological decomposition of the sealing composition.

13. A method as recited in claim 8 wherein step (a) is further practiced to add an effective amount of a preservative to minimize the possibility of fungal or bacteriological decomposition of the sealing composition.

14. A sealing composition, comprising:

10–55% by weight of: hydrogenated vegetable oil; hydrogenated animal or fish oil, fat, or grease; polyisobutane; or combinations thereof;

0.5–15% by weight of a lipophilic emulsifier; and at least 20% by weight water, in an amount sufficient to inhibit combustion of the sealing composition.

15. A sealing composition as recited in claim 14 further comprising a preservative in an amount sufficient to minimize the possibility of fungal or bacteriological decomposition.

16. A sealing composition as recited in claim 14 wherein the emulsion stabilizer or thickener comprises 0.5–5% by weight pentaerythritol ester of lanolin fatty acid, or lanolin.

17. A sealing composition as recited in claim 14 further comprising a void blocking additive which comprises: mica flakes having a maximum dimension of between 0.5–5 mm; or cellophane flakes having a maximum dimension of 1.5–20 mm; or cotton fiber having a maximum dimension of 0.5–50 mm; or granulated wood chips, walnut shells, or cork having a maximum dimension of 0.5–5 mm.

18. A sealing composition as recited in claim 14 having a trowelling grade form.

19. A sealing composition as recited in claim 14 having a pumping grade form.

\* \* \* \* \*